United States Patent [19]

Roberge

[11] 4,028,075
[45] June 7, 1977

[54] FUEL TANK CAP

[76] Inventor: Emile Roberge, 90 Portland Ave., Dover, N.H. 03820

[22] Filed: Nov. 2, 1976

[21] Appl. No.: 738,229

[52] U.S. Cl. .............................. 55/387; 210/136; 210/172; 220/202; 220/367
[51] Int. Cl.² ........................................ B01D 53/02
[58] Field of Search .............. 55/25, 26, 387; 210/136, 172; 220/85 VR, 85 VS, 202, 203, 205, 367, 368, 371

[56] References Cited

UNITED STATES PATENTS

| | | | |
|---|---|---|---|
| 2,675,093 | 4/1954 | McCall et al. | 55/387 |
| 3,546,853 | 12/1970 | Claar | 220/371 X |
| 3,831,353 | 8/1974 | Toth | 55/387 |
| 3,844,264 | 10/1974 | Grainger | 220/85 VR X |
| 3,854,911 | 12/1974 | Walker | 55/387 |

FOREIGN PATENTS OR APPLICATIONS 1,394,015   5/1975   United Kingdom ............... 220/203

Primary Examiner—Frank A. Spear, Jr.
Assistant Examiner—Richard W. Burks
Attorney, Agent, or Firm—Allen D. Brufsky

[57] ABSTRACT

A cylindrical fuel cap having a first chamber filled with vapor absorbent material, a second chamber filled with air filtering material, and a one-way check valve for establishing communication between the atmosphere and the interior of the fuel cap is placed in a fuel inlet line of a fuel tank to trap fuel vapors in the tank preventing them from being emitted to pollute the atmosphere and to provide a fuel vapor reservoir for augmenting the fuel used for combustion in an internal combustion engine, oil burner, and the like, upon demand.

7 Claims, 2 Drawing Figures

FUEL TANK CAP

BACKGROUND OF THE INVENTION

This invention relates to an air pollution control fuel tank cap which also aids in the recovery of fuel vapors from a fuel tank and the subsequent economical consumption of those vapors in the fuel system of an internal combustion engine, furnace, or the like.

It is well known that vapors evolved from the fuel tanks of automobiles, oil furnaces, and the like contribute to air pollution. This is due in part to the fact that it has been customary to vent the fuel tank to the atmosphere, thus permitting the evaporative emission of hydrocarbon vapor into the atmosphere. This situation is aggravated by fuel tank running losses caused by the flow of heated air past the tank and the tank diurnal cycle or the daily variation in temperature which causes tank breathing and the resultant loss of vapor, even if the fuel in the tank is at rest. Accordingly, not only does the emission of hydrocarbon vapors from a fuel tank contribute to air pollution, but the loss of such vapors to the atmosphere is extremely uneconomical in wasting fuel.

SUMMARY OF THE INVENTION

In accordance with the present invention a fuel tank cap is provided which substantially reduces hydrocarbon vapor emissions from the fuel tank in a fuel system. The fuel tank cap is provided with vapor absorbent material, such as activated charcoal, to absorb the vapor in the tank when the fuel system is at reat. When fuel is drawn from the tank, means are provided to purge the vapors from the tank and the absorbent cap so that these vapors can be fed to the combustion chamber of an internal combustion engine or furnace for economical consumption therein. The cap is also provided with a filter and one-way check valve for filtering and controlling the flow of air through the cap and absorbent material from the atmosphere during operation of the engine or furnace to aid in desorbing the cap and to provide pressure to move the desorbed fuel vapors from the tank.

BRIEF DESCRIPTION OF THE DRAWING

Further objects and advantages of the invention will become apparent from the following description and claims, and from the accompanying drawing, wherein:

DETAILED DESCRIPTION OF THE PREFERRED EMBODIMENT

Figure 1:
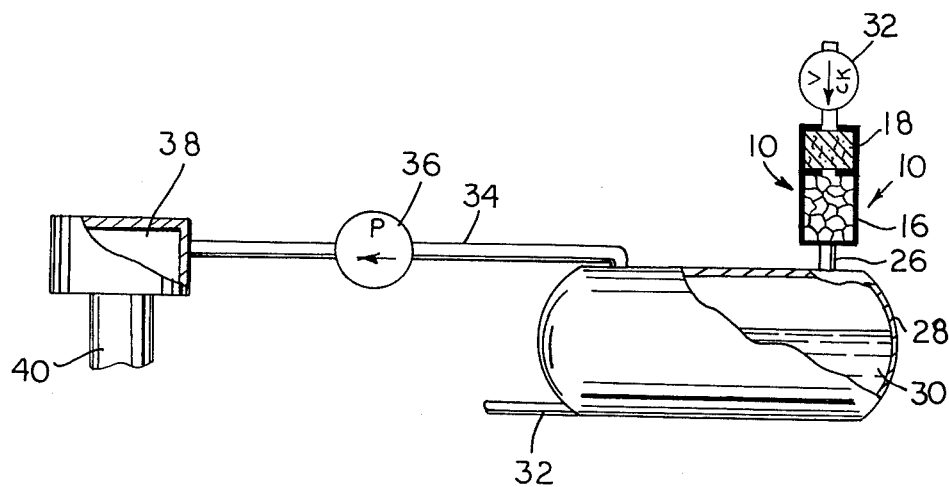
FIG. 1 is a schematic diagram of a fuel system using a fuel cap in accordance with the present invention.
Figure 2:
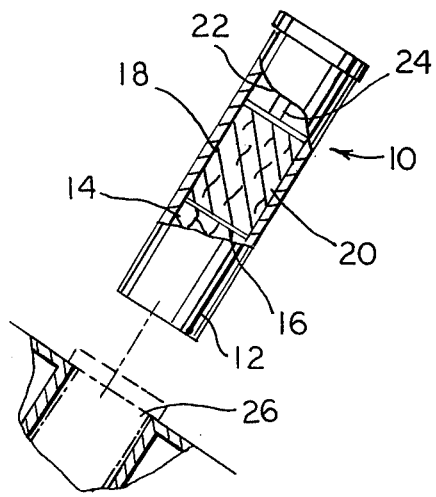
FIG. 2 is a side view in elevation, partly in section, of the fuel cap of the present invention.

Referring now to the drawing, in detail, wherein like numerals indicate like elements throughout the several views, the fuel tank cap 10 of the present invention includes a cylindrical body member 12 having a lower open end, provided with a chamber 14 containing vapor absorbent material 16, such as activated charcoal, a chamber 18 containing air filtering material 20, and a one-way check valve 22 in a chamber 24 at the top of cylinder 12 to permit air to enter chamber 24, but blocking the escape of fuel vapors from a fuel line 26 leading to a fuel tank 28. In order to fill tank 28 with fuel 30, cap 10 may be removed from fuel line 26 by sliding or rotational movement in a conventional manner. It should also be understood that fuel tank 28 may be mounted in a vehicle having an internal combustion engine or may be a fuel tank leading to a home furnace.

Fuel tank 28 is provided with a conventional liquid fuel line 32 establishing communication between the liquid phase of fuel 30 in tank 28 and the carbuerator of an internal combustion engine or the burner of a furnace. Tank 28 is also provided with a line 34 having a pump 36 for drawing vapor from the top of bank 28 and chamber 14 of cap 10 and feeding the vapor to an air chamber 38 for admixture through line 40 with the fuel and air being fed to the carbuerator or burner.

Absorbent material 16 will absorb the fuel vapors from fuel 28 when the fuel system is at rest, blocking emission of the vapors, along with check valve 22 to the atmosphere. When fuel 30 is drawn from tank 28, pump 36 will purge the vapors accumulated in the tank above the liquid fuel 30 along with desorbing the vapors accumulated in chamber 14 of cap 10 and pass them to air chamber 38 through line 34 so that there vapors can be fed to a combustion chamber, augmenting the available energy to the combustion chamber. Valve 22 and filter 20 pass atmospheric air into tank 28 to mix with the fuel vapors and to aid in pushing the vapors through line 34.

While a specific embodiment of a fuel tank cap has been disclosed in the foregoing description, it will be understood that various modifications within the spirit of the invention may occur to those skilled in the art. Therefore, it is intended that no limitations be placed on the invention except as defined by the scope of the appended claims. I claim:

1. A fuel tank cap adapted to be placed in a fuel line to a fuel tank comprising:
    a cylindrical body member having a lower open end and a closed upper end;
    a chamber in said body member adjacent said lower end containing fuel vapor absorbent material; and
    valve means between said chamber and upper end of said body member for permitting air to flow through said chamber from the atmosphere.

2. The cap of claim 1 including
    a second chamber in said body member between said first chamber and said valve means containing air filtering material.

3. The cap of claim 2, wherein said valve means is a one-way check valve.

4. A fuel system comprising:
    a fuel tank containing liquid and vapor fuel, said vapor phase being above said liquid phase in said tank;
    a first fuel outlet line connected to the liquid fuel phase in said tank;
    a second fuel outlet line connected to the vapor fuel phase in said tank;
    a fuel inlet line connected to said tank;
    a fuel tank cap adapted to be placed in said fuel inlet line, said cap including,
    a cylindrical body member having a lower open end and a closed upper end,
    a chamber in said body member adjacent said lower end containing fuel vapor absorbent material; and
    valve means between said chamber and upper end of said body member for permitting air to flow through said chamber from the atmosphere.

5. The system of claim 4, including a second chamber in said body member between said first chamber and said valve means containing air filtering material.

6. The system of claim 5, wherein said valve means is a one-way check valve.

7. The system of claim 6 including pump means in said second fuel outlet line for drawing fuel vapor from said tank and first chamber in said cap.

* * * * *